(12) United States Patent
Buczynski

(10) Patent No.: US 11,199,216 B2
(45) Date of Patent: Dec. 14, 2021

(54) ERGONOMIC BOX NUT RETAINER

(71) Applicant: ILLINOIS TOOL WORKS INC., Glenview, IL (US)

(72) Inventor: Gregory George Buczynski, Ferndale, MI (US)

(73) Assignee: Illinois Tool Works Inc., Glenview, IL (US)

(*) Notice: Subject to any disclaimer, the term of this patent is extended or adjusted under 35 U.S.C. 154(b) by 313 days.

(21) Appl. No.: 16/474,613

(22) PCT Filed: Jan. 16, 2018

(86) PCT No.: PCT/US2018/013757
§ 371 (c)(1),
(2) Date: Jun. 28, 2019

(87) PCT Pub. No.: WO2018/144210
PCT Pub. Date: Aug. 9, 2018

(65) Prior Publication Data
US 2019/0338803 A1    Nov. 7, 2019

Related U.S. Application Data

(60) Provisional application No. 62/452,631, filed on Jan. 31, 2017.

(51) Int. Cl.
*F16B 37/04*    (2006.01)
*F16B 5/02*    (2006.01)
*F16B 13/08*    (2006.01)

(52) U.S. Cl.
CPC .......... *F16B 37/043* (2013.01); *F16B 5/0258* (2013.01); *F16B 13/08* (2013.01); *F16B 37/04* (2013.01)

(58) Field of Classification Search
CPC ...... F16B 5/0258; F16B 13/08; F16B 37/041; F16B 37/043; F16B 37/044; F16B 37/045; F16B 37/04; Y10S 411/97; Y10S 411/917
(Continued)

(56) References Cited

U.S. PATENT DOCUMENTS

| 3,035,624 A | 5/1962 | Jaworski |
| 4,036,389 A | 7/1977 | Pate et al. |

(Continued)

FOREIGN PATENT DOCUMENTS

| CN | 1688824 A | 10/2005 |
| CN | 101855462 A | 10/2010 |

(Continued)

OTHER PUBLICATIONS

First Office Action from corresponding Chinese Patent Application No. 201880008779.8, dated Sep. 24, 2020 (13 pages).
(Continued)

*Primary Examiner* — Roberta S Delisle
(74) *Attorney, Agent, or Firm* — Quarles & Brady LLP

(57) ABSTRACT

A box nut retainer system includes a panel configured to receive a fastener. The box nut retainer system includes a plurality of retainer legs extending from the panel. The box nut retainer system includes planar bends positioned at distal ends of the plurality of retainer legs. Straight beams extend from the planar bends. The straight beams have engagement angles relative to the plurality of retainer legs.

19 Claims, 5 Drawing Sheets

(58) Field of Classification Search
USPC .................. 411/172–175, 176, 178, 432
See application file for complete search history.

(56) References Cited

U.S. PATENT DOCUMENTS

| | | | | |
|---|---|---|---|---|
| 5,873,690 | A | * | 2/1999 | Danby .................. F16B 37/043 411/55 |
| 5,919,019 | A | | 7/1999 | Fischer |
| 6,095,734 | A | * | 8/2000 | Postadan ............... F16B 37/043 411/173 |
| 7,226,260 | B2 | * | 6/2007 | Jackson, Jr. .......... F16B 21/076 411/112 |
| 7,568,870 | B2 | * | 8/2009 | Paquet .................. F16B 37/043 411/177 |
| 7,874,775 | B2 | * | 1/2011 | Hullmann ............. F16B 37/043 411/173 |
| 8,016,530 | B2 | * | 9/2011 | Johnson ................. F16B 5/065 411/173 |
| 8,790,056 | B2 | * | 7/2014 | Fuentes Domingo .. F16B 37/02 411/173 |
| 9,440,596 | B2 | * | 9/2016 | Huelke ............... B60R 13/0206 |
| 9,562,554 | B2 | * | 2/2017 | Vidal ...................... F16B 37/02 |
| 2002/0054808 | A1 | | 5/2002 | Vassiliou |
| 2008/0286066 | A1 | * | 11/2008 | Paquet .................. F16B 37/043 411/177 |
| 2016/0208839 | A1 | | 7/2016 | Vidal et al. |
| 2019/0383318 | A1 | * | 12/2019 | Buczynski .......... B60R 13/0206 |

FOREIGN PATENT DOCUMENTS

| | | |
|---|---|---|
| CN | 102656376 A | 9/2012 |
| CN | 203926308 U | 11/2014 |
| CN | 204784079 U | 11/2015 |
| DE | 19821255 A1 | 11/1999 |
| DE | 20319556 U1 | 3/2004 |
| DE | 102006001741 A1 | 8/2007 |
| FR | 2945844 A1 | 11/2010 |

OTHER PUBLICATIONS

International Search Report for PCT/US2018/013757, dated Mar. 14, 2018.
Notice of Allowance from corresponding Chinese Patent Application No. 201880008779.8 dated May 21, 2021, (3 pages) (English translation included).
Supplemental Search Report from corresponding Chinese Patent Application No. 201880008779.8 dated Apr. 3, 2021 (2 pages).

* cited by examiner

ERGONOMIC BOX NUT RETAINER

RELATED APPLICATIONS

This application represents the United States National Stage of International Application No. PCT/US2018/013757, filed Jan. 16, 2018, which claims priority to U.S. Provisional Patent Application No. 62/452,631, entitled "Ergonomic Box Nut Retainer," filed Jan. 31, 2017, which are hereby incorporated by reference in their entirety.

FIELD OF EMBODIMENTS OF THE DISCLOSURE

Embodiments of the present disclosure generally relate to a fastening system, and, more particularly, to a box nut retainer system that is configured to securely connect multiple components together.

BACKGROUND

Box nuts are used to secure two components together, such as two separate and distinct panels. Box nut retainers are used to hold a box nut with respect to a mating panel. A known box nut retainer provides an engagement angle in relation to a component that is generally dictated by a height of the box, a finger protrusion from the box, and a panel range of the nut. For example, the box nut retainer described in U.S. Pat. No. 5,919,019, entitled "Mid-Panel Nut," discloses a nut for mounting into an opening located in a central part of a panel. However, it has been found that certain conventional box nuts may not remain securely attached to a panel.

SUMMARY OF EMBODIMENTS OF THE DISCLOSURE

A need exists for a box nut that is configured to remain at a secure fixed position in relation to a component, such as a panel.

With that need in mind, certain embodiments of the present disclosure provide a box nut retainer system. The box nut retainer system includes a panel configured to receive a fastener. The box nut retainer system includes a plurality of retainer legs extending from the panel. Further, the box nut retainer system includes planar bends positioned at distal ends of the plurality of retainer legs. Straight beams extend from the planar bends. The straight beams have engagement angles relative to the plurality of retainer legs.

Additionally or alternatively, the box nut retainer system includes a fastener tube that extends through the panel. Optionally, the fastener tube extends through the upper panel and defines a fastener intake passage. Optionally, the fastener intake passage includes an internal circumference that is threaded.

Additionally or alternatively, an insertion force of the fastener is based on the engagement angles. Optionally, the panel is interposed between a mating panel and a fastener panel. Optionally, the insertion force of the fastener is configured to generate a compression pressure on the mating panel and the fastener panel.

Additionally or alternatively, the plurality of retainer legs are configured to extend or spread apart such that a plurality of guides abut the fastener. Optionally, the plurality of retainer legs are positioned a distance away from the fastener tube extending from the panel.

Additionally or alternatively, the plurality of retainer legs are positioned a distance away from the fastener tube extending from the panel. Optionally, the fastener tube is configured to receive threaded fasteners, such as M5 fasteners.

Additionally or alternatively, responsive to the plurality of retainer legs spreading, the straight beams are configured to be directed towards a fastener panel. Optionally, the straight beams are configured to protrude from the plurality of retainer legs based on the engagement angles. Optionally, responsive to the plurality of retainer legs spreading the straight beams are configured to be in contact with a fastener panel.

In at least one embodiment, a box nut retainer system includes a panel configured to receive a fastener. The box nut retainer system includes a fastener tube that extends through the panel. The fastener tube extends through the panel and defines a fastener intake passage. The box nut retainer system includes a plurality of retainer legs extending from the panel. The plurality of retainer legs extend from the panel. The box nut retainer system includes planar bends positioned at distal ends of the plurality of retainer legs. Straight beams extend from the planar bends. The straight beams having engagement angles relative to the plurality of retainer legs. The straight beams are configured to protrude from the plurality of retainer legs based on the engagement angle. An insertion force of the fastener is based on the engagement angles.

Additionally or alternatively, the panel is interposed between a mating panel and a fastener panel. An insertion force of the fastener is configured to generate a compression pressure on the mating panel and the fastener panel.

Additionally or alternatively, the plurality of retainer legs are configured to extend or spread out responsive to the insertion of the fastener in the fastener tube such that a plurality of guides abut the fastener.

Additionally or alternatively, the plurality of retainer legs are positioned a distance away from the fastener passage area extending from the panel.

Additionally or alternatively, the fastener tube includes an internal circumference that is threaded. Optionally, the fastener tube is configured to receive threaded fasteners, such as (but not limited to) M5 fasteners.

In at least one embodiment, a box nut retainer system includes a panel configured to receive a fastener. The box nut retainer system includes a fastener tube that extends through the panel. The fastener tube extends through the panel and defines a fastener intake passage. The fastener tube includes an internal circumference that is threaded. The box nut retainer system includes a plurality of retainer legs extending from the panel. The plurality of retainer legs extend at curved orthogonal angles from the upper panel. The plurality of retainer legs being positioned a distance away from the fastener tube and extend from the panel. The plurality of retainer legs are configured to extend towards a fastener panel responsive to the fastener inserted into the fastener tube. The box nut retainer system includes planar bends positioned at distal ends of the plurality of retainer legs. Straight beams extend from the planar bends. The straight beams having engagement angles relative to the plurality of retainer legs. The straight beams are configured to protrude from the plurality of retainer legs based on the engagement angles. An insertion force of the fastener is based on the engagement angles.

Figure 1:
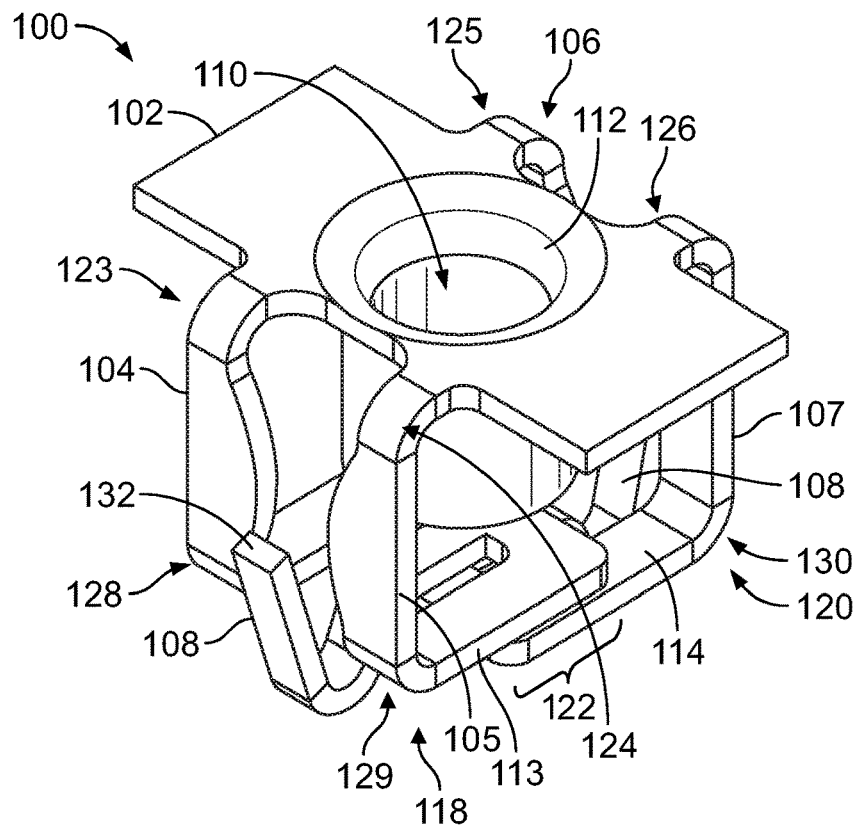
FIG. 1 illustrates a perspective top view of a box nut retainer system, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a box nut retainer system that includes one or more retainer legs that bend away from an upper panel, and allow the box nut retainer system to provide an engagement angle relative to a component. The engagement angle is adjustable. Based on the engagement angle, an amount of the insertion force for the fastener for the box nut retainer system is determined.

The engagement angles are utilized to determine the ergonomic requirements of the box nut retainer system. The ergonomic requirements relate to an amount of torque needed to insert the fastener into the box nut retainer system. For example, the engagement angles can be adjusted to allow the fastener to be inserted onto the box nut retainer system by hand and/or use a machine (e.g., drill). The engagement angles are based on straight beams that extend from planar bends relative to the retainer legs. The beams are used to maintain a fixed position of the box nut retainer system relative to a panel.

FIG. 1 illustrates a peripheral view of a box nut retainer system 100, according to an embodiment of the present disclosure. The box nut retainer system 100 includes a panel 102. The panel 102 extends a length of the box nut retainer system 100. A fastener tube 112 downwardly extends from the panel 102. The tube 112 defines an opening 110, which extends through the panel 102. The tube 112 defines a fastener intake passage. For example, the fastener intake passage guides the fastener in between the legs 104-107.

The tube 112 is configured to receive a fastener (e.g., a screw, bolt). For example, an opening 110 of the tube 112 is configured to receive the fastener. Optionally, an internal circumference of the tube 112 includes threads. The threads are configured to guide and/or align with the fastener to traverse through the tube 112. For example, the threads of the tube 112 are opposed to the threads of the fastener, which direct the fastener further inward into the tube 112. The tube 112 is positioned at a central location of the panel 102. For example, the tube 112 is interposed between a plurality of retainer legs 104-107, and extends (e.g., the fastener intake passage) through the panel 102.

The tube 112 extends from the opening 110 downwards from the panel 102 towards planar bends 113, 114. The opening 110 may have a diameter similar to and/or the same as the tube 112. For example, the diameter of the tube 112 and/or the opening 110 are configured to receive fasteners having a common size and/or diameter. Additionally or alternatively, the threads along an inner circumference of the tube 112 further extend along the inner circumference of the opening 110. For example, the threads may threadably engage threads of a fastener inserted into the tube 112. The threads of the tube 112 are configured to guide and/or align with threads of the fastener. The threads enable the fastener to downwardly traverse through the tube 112.

The tube 112 is configured to receive an externally threaded fastener. Additionally or alternatively, the tube 112 may be configured to accept a specific type of fastener. As but one non-limiting example, the tube 112 may be configured to accept M5 fasteners. The tube 112 may be configured to have a diameter based on the M5 fastener. The M5 bolts may include a socket head/cap screw of 4 mm, and a hex nut and/or bolt diameter of 8 mm. Optionally, the M5 screws have a button head cap screw and/or a flat head countersunk cap screw of 3 mm. The bolt and/or screw can have a set screw length between 2.5 mm to 7.5 mm. Optionally, the M5 screws and/or bolts are based on the International Organization for Standardization (ISO) 965, "ISO General Purpose Metric Screw Thread—Tolerances," the American National Standards Institute B4.2-1978, "Preferred Metric Limits and Fits," the American National Standards Institute B1.13M, "Metric Screw Threads: M Profile," and/or the like.

The legs 104-107 extend from the panel 102 outside the tube 112. For example, the legs 104-107 protrude and/or extend from the panel 102 along curved orthogonal angles 123-126. The curved orthogonal angles 123-126 connect to the legs 104-107 to the plate 102. The curved orthogonal angles 123-126 are angled to protrude from an edge of the panel 102. Based on the angle of the curved orthogonal angles 123-126, the legs 104-107 are outwardly disposed from the panel 102. The curved orthogonal angles 123-126 are configured to downwardly direct the legs 104-107.

The extension of the curved orthogonal angles 123-126 is configured to define a distance between the legs 104-107 and the tube 112. The distance allows the legs 104-107 to spread out responsive to a distal end of the fastener traversing through the tube 112 without abutting and/or in contact with the tube 112 and/or the fastener. For example, responsive to a distal end of the fastener traversing through the tube 112 out of the opening 110, the legs 104-107 extend outside the panel 102. As the legs 104-107 spread out and/or extend, the distance between the legs 104-107 and the tube 112 increases. The increase in the distance allows the legs 104-107 to spread out without being in contact with the tube 112.

The legs 104-107 extend downwards, and connect to the planar bends 113, 114. The planar bends 113, 114 are formed by curved orthogonal angles 128-130 at the ends 118, 120. The curved orthogonal angles 128-130 direct the planar bends 113, 114 towards the opposing legs 104-107. For example, the planar bend 113 of the legs 104-105 is directed toward the legs 106-107, and the planar bend 114 of the legs 106-107 is directed toward the legs 104-105. Additionally or alternatively, the legs 104-105 are coupled together to form the planar bend 113, and the legs 106-107 are coupled together to form the planar bend 114.

The planar bends 113, 114 are directed towards each other based on the curved orthogonal angles 128-130. Additionally, the planar bend 113 is shown over the planar bend 114. Optionally, the planar bend 114 may overlap the planar bend 113. The overlap of the planar bends 113, 114 form an overlap region 122. The overlap region 122 is configured to encounter the fastener traversing through the tube 112. For example, responsive to a fastener traversing through the tube 112, the fastener applies a compression pressure to a panel. The compression pressure of the panel spreads the planar bends 113, 114 from each other and spreads the legs 104-107. For example, the compression pressure applied by the fastener, which separates the planer bends 113, 114 and spreads the legs 104-107. Responsive to the expansion of the legs 104-107, the legs 104-107 extend outside the panel 102.

Figure 3:
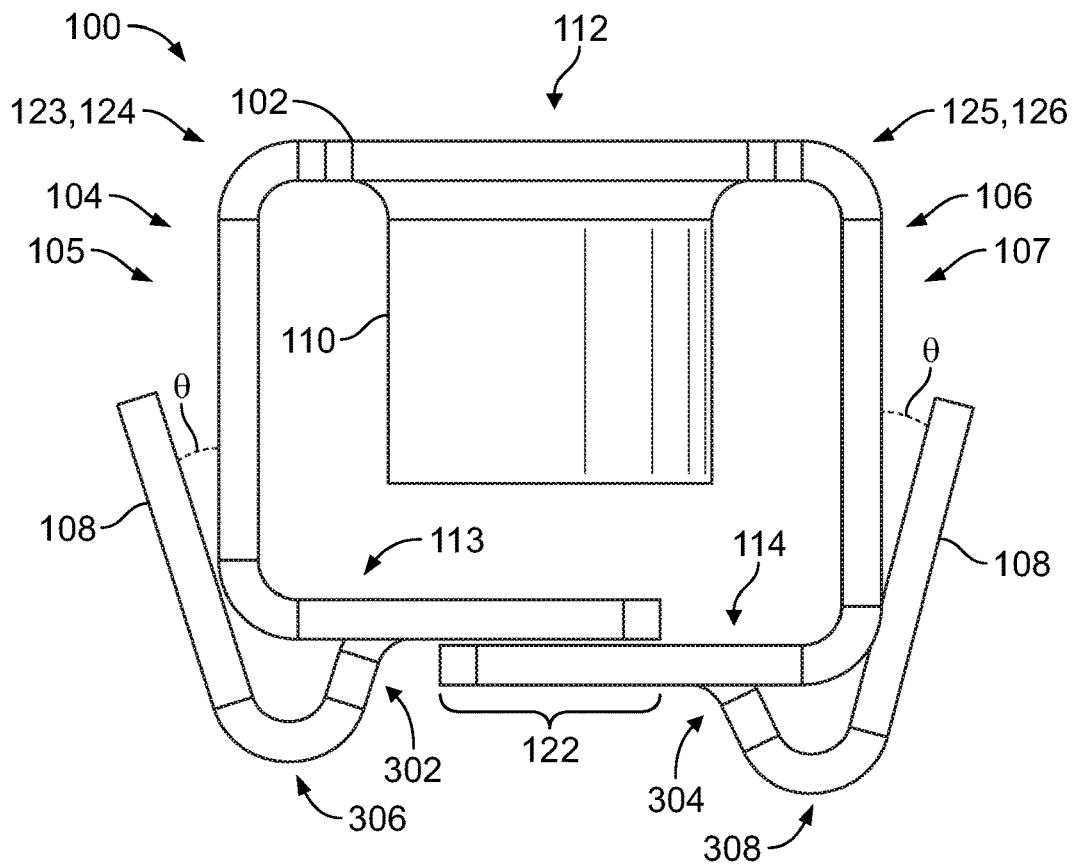
FIG. 3 illustrates a lateral view of a box nut retainer system, according to an embodiment of the present disclosure.

Straight beams 108 extend from the planar bends 113, 114 as shown in FIG. 3 at engagement angles θ. The engagement angles θ of the beams 108 are defined relative to the surface of the legs 104-107.

Figure 7:
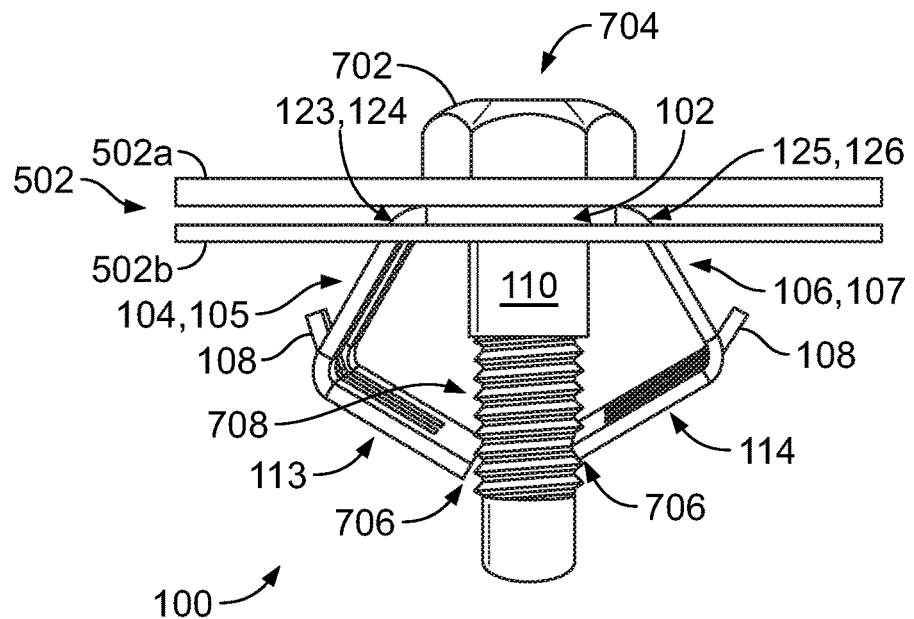
FIG. 7 illustrates a lateral view of a box nut retainer system receiving a fastener, according to an embodiment of the present disclosure.
Figure 8:
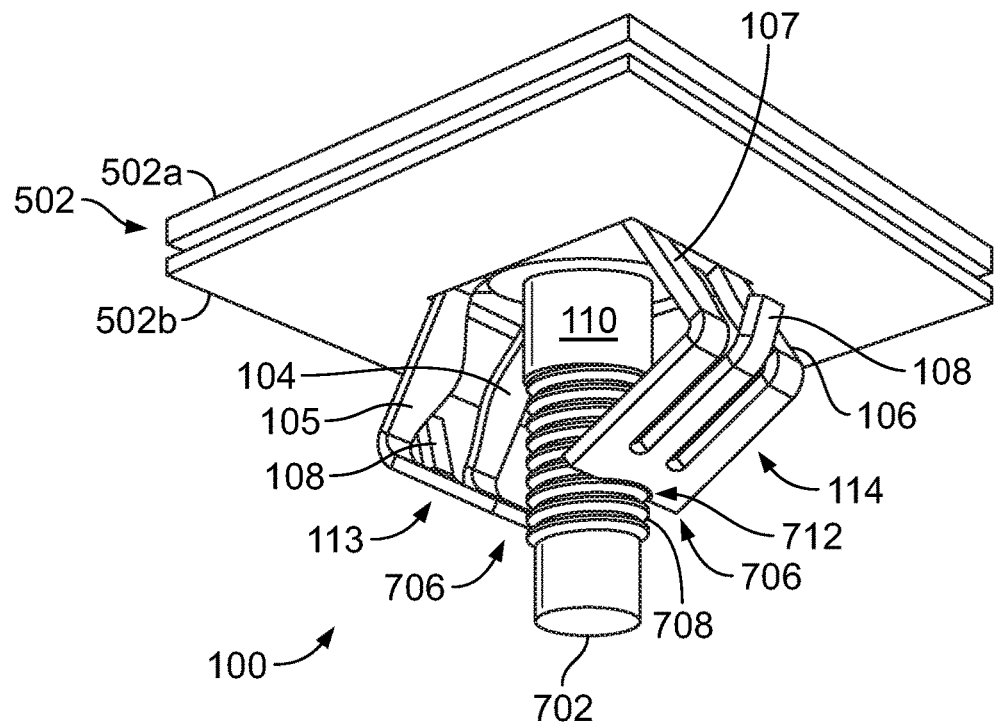
FIG. 8 illustrates a perspective bottom view of a fastener into a box nut retainer system, according to an embodiment of the present disclosure.
Figure 9:
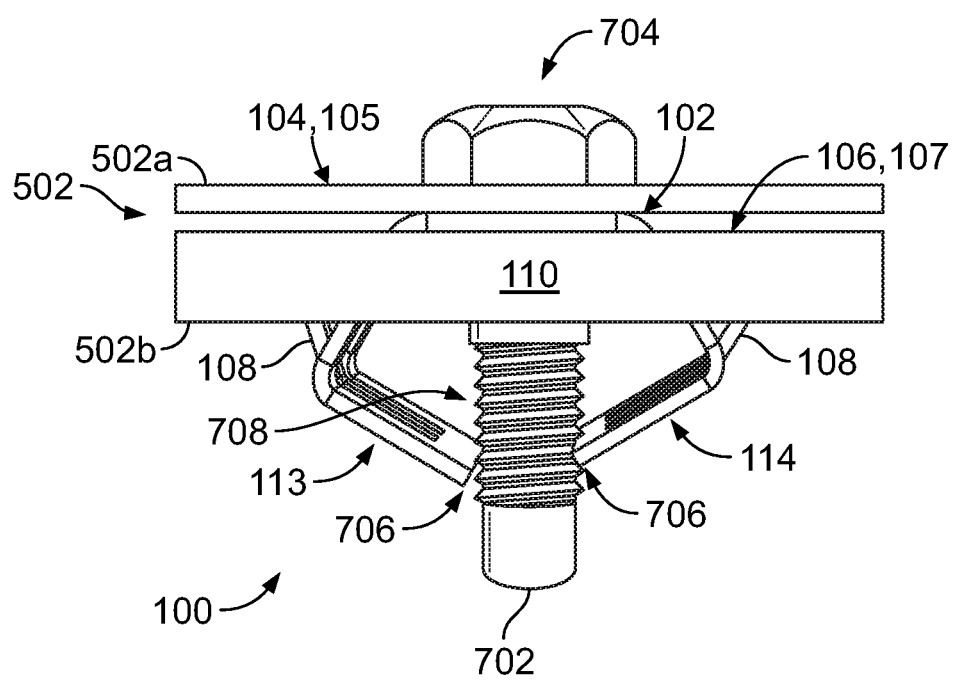
FIG. 9 illustrates a lateral view of a fastener coupled to a box nut retainer system, according to an embodiment of the present disclosure.

The engagement angles θ define a Finsertion force of the box nut retainer system 100 (e.g., as shown in Equation 1). The Finsertion force represents an amount of torque applied to the fastener traversing through the tube 112 of the box nut retainer system 100. The engagement angles θ define the Finsertion force of the fastener (e.g., Equation 1). The engagement angles θ of the beams 108 are configured and/or tailored based on the application of the box nut retainer system 100. For example, the Finsertion force can be configured by the engagement angles θ to allow the fastener to be inserted by hand and/or a machine (e.g., drill). Additionally, responsive to the spreading and/or expansion of the legs 104-107, the engagement angles θ of the beams 108 are positioned to be directly adjacent to the panel as shown in FIGS. 7-9.

Figure 2:
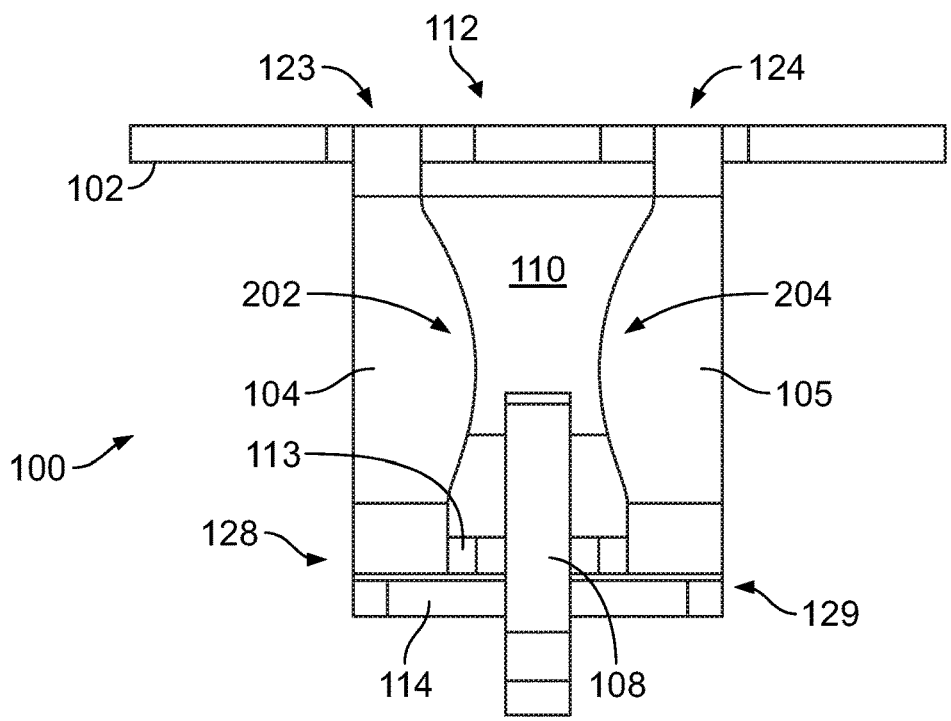
FIG. 2 illustrates a lateral view of a box nut retainer system, according to an embodiment of the present disclosure.

FIG. 2 illustrates a lateral view of the box nut retainer system 100, according to an embodiment of the present disclosure. The legs 104-107 are shown having arcs 202, 204 that extend towards an opposing one of the legs 104-107. The arcs 202, 204 extend from the legs 104-107 towards an opposing leg. It may be noted that the legs 106-107 not shown in FIG. 2 have similar arcs. For example, the leg 104 includes the arc 202 that extends towards the arc 204 of the leg 105. In connection with FIG. 3, the beams 108 extend from the planar bends 113, 114.

FIG. 3 illustrates a lateral view of the box nut retainer system 100, according to an embodiment of the present disclosure. The beams 108 are shown extending from the planar bends 113, 114 having the engagement angles θ. The legs 104-107 extend from the curved orthogonal angles 123-126 and are coupled to form the planar bends 113, 114. The lateral view shows the beams 108 extending from the planar bends 113, 114. In connection with FIGS. 2-3, the beams 108 extend from a center retainer leg 302, 304 from the planar bends 113, 114. The legs 302, 304 are shown extending at a curved angle. The curved angle extends downward away from the planar bends 113, 114. The legs 302, 304 further extend at curved angles 306, 308. Extending from the curved angles 306, 308 are the beams 108. The angle defined by the curved angles 306, 308 forms the engagement angles θ.

The beams 108 extend from the curved angles 306, 308 and protrude away from the legs 104-107 at the engagement angles θ. The engagement angles θ define an amount of torque needed to traverse the fastener through the tube 112 and/or the opening 110. For example, as the magnitude of the curved angles 306, 308 increase the engagement angles θ of the box nut retainer system 100 increases. The increase in the engagement angles θ increases the Finsertion force of the box nut retainer system 100. In another example, as the magnitude of the curved angles 306, 308 decreases the engagement angles θ of the box nut retainer system 100 decrease. The decrease in the engagement angles θ decreases the Finsertion force of the box nut retainer system 100.

Figure 4:
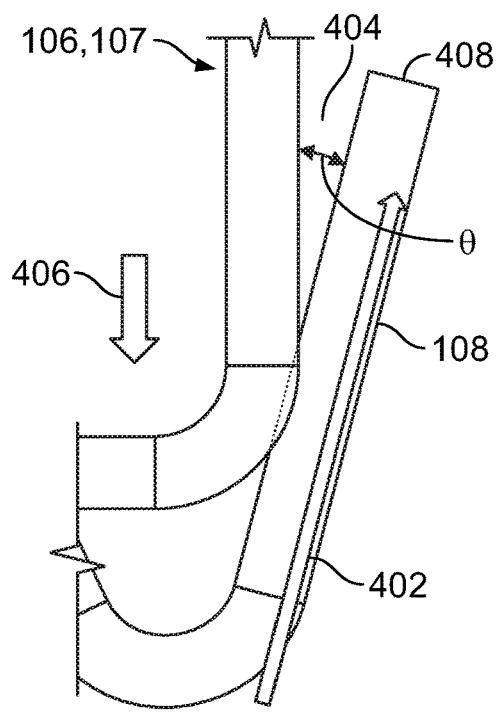
FIG. 4 illustrates a lateral view of legs of a box nut retainer system, according to an embodiment of the present disclosure.

FIG. 4 illustrates a lateral view of the box nut retainer system 100, according to an embodiment of the present disclosure. FIG. 4 illustrates forces that are applied to the box nut retainer system 100 responsive to an insertion of the fastener through the tube 112. The variable M 402 represents a moment necessary force, which represents an amount of force needed to flex and/or spread the legs 104-107. The variable Lretention 404 represents a distance between a distal end 408 of the beams 108 and the legs 104-107. For example, the Lretention 404 is based on the curved angles 306, 308, which extend from the planar bends 113, 114. The variable Finsertion 406 force represents the insertion force (e.g., torque) to insert the fastener through the tube 112 and/or the opening 110. For example, the Finsertion 406 force represents an amount of torque applied to the fastener to traverse through the tube 112. Additionally or alternatively, the Finsertion 406 force represents an amount of force needed for the fastener to spread out the legs 104-107 or separate the planar bends 113, 114. The M 402 and the Lretention 404 are based on the structure and/or characteristics of the box nut retainer system 100.

$$\left(\frac{M}{Lretention}\right)(\sin^2\theta) = Finsertion \qquad \text{Equation (1)}$$

As shown in Equation 1, the Finsertion 406 force is proportional to the engagement angles θ of the beams 108. For example, the engagement angles θ can be adjusted it of the features of the box nut retainer system 100 which adjusts the Finsertion 406 force for the fastener. Additionally, the variables M 402 and Lretention 404 may be constant based on the characteristics of the box nut retainer system 100. Based on adjustments to the curved angles 306, 308, the engagement angles θ of the beams 108 can be tailored to define the Finsertion 406 force for the fastener. It may be noted that the Finsertion 406 force of the box nut retainer system 100 can be tailored to adjust the insertion force without a corresponding reduction in an extraction force. The engagement angles θ of the beams 108 allow the box nut retainer system 100 to be adjusted based on customer ergonomic requirements.

For example, the box nut retainer system 100 can be configured such that the Finsertion 406 force of the fastener stays within limits for hand insertion, such as less than 3 N of torque. In at least one embodiment, the box nut retainer system 100 may include the engagement angles θ of 0.1 degrees resulting in the Finsertion 406 force of approximately 1.2 N.

In another example, the box nut retainer system 100 can be configured such that the Finsertion 406 force of the fastener does not stay within the limits for hand insertion. The box nut retainer system 100 can be configured such that a machine (e.g., drill) is utilized to apply torque to the fastener. The box nut retainer system 100 can include the engagement angle θ of 0.5 degrees resulting in the Finsertion 406 force of approximately 31 N.

Figure 5:
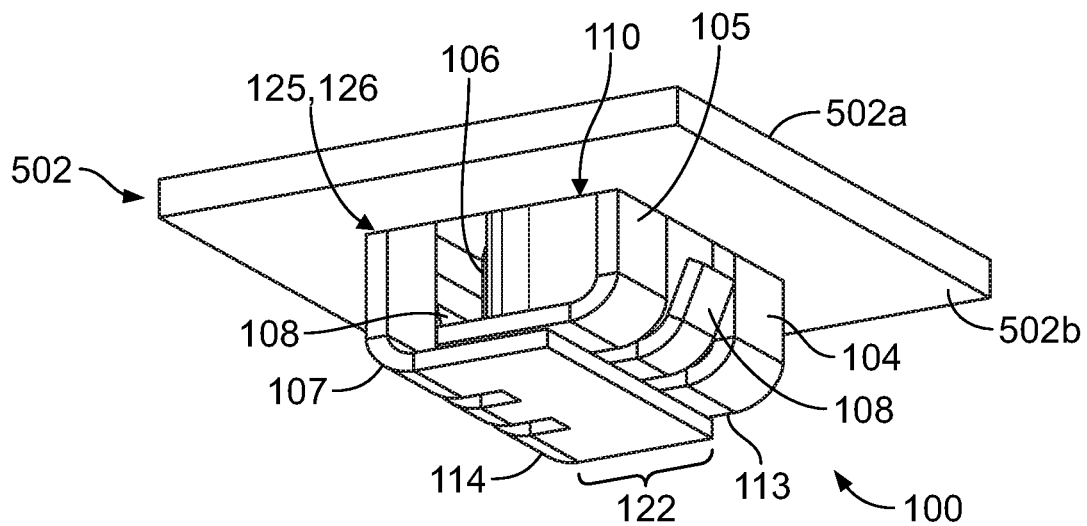
FIG. 5 illustrates a perspective bottom view of a fastener into a box nut retainer system, according to an embodiment of the present disclosure.
Figure 6:
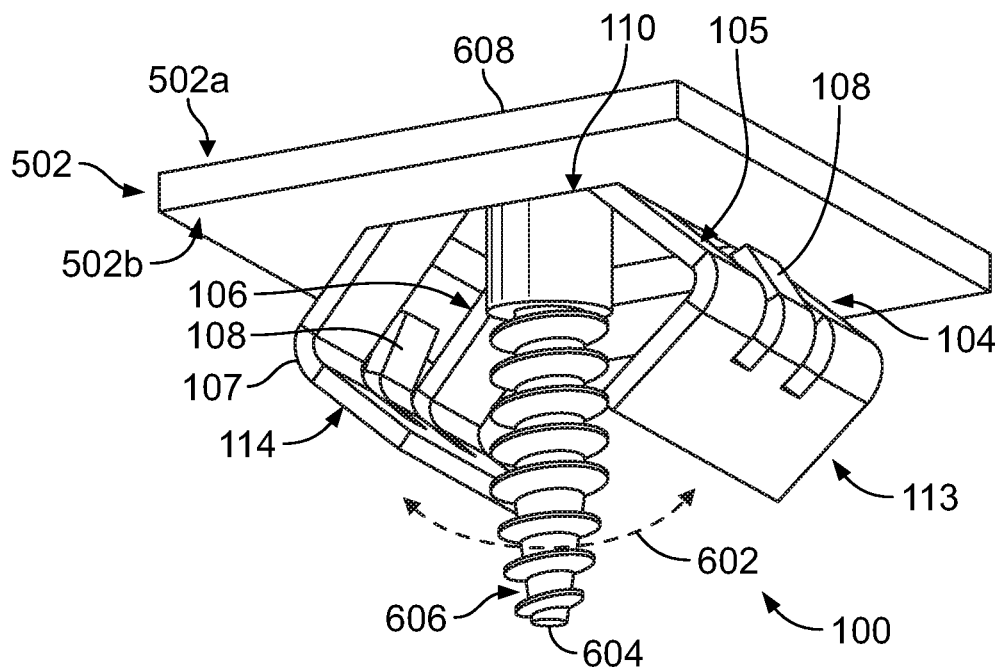
FIG. 6 illustrates a perspective bottom view of a fastener extending into a box nut retainer system, according to an embodiment of the present disclosure.

FIG. 5 illustrates a lateral view of the legs 104-107 of the box nut retainer system 100, according to an embodiment of the present disclosure. The box nut retainer system 100 is shown embedded within a panel 502. For example, the panel 502 includes two opposing panels such as a mating panel 502a and a fastener panel 502b. The mating panel 502a is positioned above the fastener panel 502b. The panel 502 (e.g., the mating panel 502a, the fastener panel 502b) includes an opening for the fastener 602 (FIG. 6). The openings of the mating and fastener panels 502a-b are aligned with respect to each other to allow the fastener 604 to pass through the panel 502. The panel 102 is positioned directly under the mating panel 502a and is interposed between the mating and fastener panels 502a-b. Additionally or alternatively, the fastener panel 502b further includes openings for the legs 104-107. The openings are configured such that the legs 104-107 downwardly extend relative to the fastener panel 502b. For example, the legs 104-107 pass through the openings, which allow the panel 102 to be overlaid or in direct contact with the fastener panel 502b. Additionally, the curved orthogonal angles 123-126 are shown interposed between the mating and fastener panels 502a-b.

The planar bends 113, 114 are shown having the overlap region 122. The overlap region 122 is formed by the overlap of the planar bends 113, 114 with respect to each other. For example, the planar bend 114 is shown under the planar bend 113. The overlap region 122 is formed by the curved orthogonal angles 128-130 (FIG. 1) directed towards each other. Responsive to the fastener 604 traversing through the tube 112, the legs 104-107 spread apart with respect to each other. For example, the fastener 604 applies a compression pressure to the mating and fastener panels 502a-b. The compression pressure of the mating and fastener panels 502a-b separate the legs 104-107, which further separate the planar bends 113, 114 with respect to each other as further described in connection with FIG. 6.

FIG. 6 illustrates a perspective bottom view of the fastener 604 extending into the box nut retainer system 100, according to an embodiment of the present disclosure. A torque is applied to the fastener 604. An amount of torque applied to the fastener 604 is based on the Finsertion 406 force, and the engagement angle θ of the beams 108 (e.g., Equation 1).

Responsive to the torque applied to the fastener 604, the fastener 604 traverses through the tube 112. For example, threads 606 of the fastener 604 traverse downward based on the threads of an internal circumference of the tube 112. Responsive to the fastener 604 being guided through the tube 112, the fastener 604 generates an opposing force based on the direction of the threads of the tube 112. For example, the internal threads of the tube 112 (e.g., clockwise, counter-clock wise) are opposed with respect to the threads 606 of the fastener 604 (e.g., counter-clock wise, clockwise). Based on the opposing threads, the tube 112 generates an upward force of the box nut retainer system 100.

Responsive to the fastener 604 being guided through the tube 112, a downward force is further applied to the mating panel 502a. As the fastener 604 traverses through the tube 112, a head 608 of the fastener 604 abuts and/or is in contact with the mating panel 502a. The head 608 applies a downward force on the mating panel 502a. As the torque is being applied to the fastener 604, the threads 606 drive the fastener 604 downward into the tube 112. The downward force of the head 608 onto the mating panel 502a applies a force onto the fastener panel 502b.

The opposing forces applied by the fastener 608 generate the compression pressure between the mating and fastener panels 502a-b. The compression pressure applied to the mating and fastener panels 502a-b generate a force onto the curved orthogonal angles 123-126 that are interposed between the mating and fastener panels 502a-b. The compression pressure is applied to the curved orthogonal angles 123-126 interposed between the mating and fastener panels 502a-b. The compression pressure applies a force onto the curved orthogonal angles 123-126. The compression pressure flattens the curved orthogonal angles 123-126. Responsive to the compression pressure of the curved orthogonal angles 123-126, the legs 104-107 are moved (for example, spread, flattened, or the like) towards the fastener panel 502b. For example, the compression pressure flattens and/or reduces the curve of the curved orthogonal angles 123-126. The reduction of the curved displaces the legs 104-107 towards the fastener panel 502b. Additionally, the expansion of the legs 104-107 separates the panel bends 113, 114 from each other along an arrow 602. The spreading of the legs 104-107 further displaces the curved orthogonal angles 128-130. For example, positions of the curved orthogonal angles 128-130 are adjusted along the arrow 602 towards the fastener panel 502b. As the legs 104-107 spread, the beams 108 are directed toward the fastener panel 502b.

FIG. 7 illustrates the box nut retainer system 100 receiving a fastener 702, according to an embodiment of the present disclosure. A torque is applied to the fastener 702. An amount of torque applied to the fastener 702 is based on the Finsertion 404 force, and the engagement angle θ of the beams 108 (e.g., Equation 1). Responsive to the torque applied to the fastener 702, a shaft of the fastener 702 traverses through the tube 112. The fastener 702 is directed downwards into the tube 112 via the torque.

The fastener 702 generates the compression pressure to the mating and fastener panels 502a-b. For example, responsive to the fastener 702 guided through the tube 112 and/or the opening 110, the threads 708 of the fastener 702 and the threads of the tube 112 and/or opening 110 generates an upward force towards the fastener panel 502b. As the fastener 702 is directed downward within the tube 112, a head 704 of the fastener 702 applies a downward force onto the mating panel 502a. The opposing forces generate the compression pressure within the mating and fastener panels 502a-b. The compression pressure flattens the curved orthogonal angles 123-126, which spread apart the legs 104-107 with respect to each other. For example, the curved orthogonal angles 128-130 are re-positioned towards the fastener panel 502b. The flattening of the curved orthogonal angles 128-130, spreads the legs 104-107 towards the fastening panel 502b.

Optionally, guides 706 may be at distal ends of the planar bends 113, 114. The guides 706 are configured to align and/or guide the planar bends 113, 114 with the threads 708 of the fastener 702. The guides 706 may be formed as circular indentations 712 (FIG. 8), which align with the threads 708 of the fastener 702. For example, the guides 706 may represent an indentation at a distal end of the planar bends 113, 114. The guides 706 align with the threads 708 for spreading the legs 104-107. For example, the fastener 702 applies the compact pressure on the mating and fastener panels 502a-b, and the legs 104-107 spread open. The guides 702 are repositioned based on the spreading of the legs 104-107 towards the threads 708 of the fastener 702. As the torque is applied to the fastener 702, the guides 706 follow the threads 708 upwards along the fastener 702. For example, as the fastener 702 proceeds downwards through the tube 112, the guides 706 are guided by the threads 706 and traverse upwards toward the head 704 of the fastener 702. As the guides 706 aide in spreading the legs 104-107 as the planar bends 113, 114 traverse towards the fastener panel 502b.

Optionally, the guides 706 and the threads along an inner circumference of the tube 112 are configured to increase an extraction force of the fastener 702. The extraction force represents an amount of force needed to extract the fastener 702 from the box nut retainer system 100 and the panel 502. The threads 708 of the fastener 702 traverse through the tube 112 and the guides 706. The threads within the tube 112 add to the extraction force of the fastener 702. For example, the threads 708 are aligned with the threads of the tube 112. The threads 708 of the fastener 702 are vertically obstructed by the threads of the tube 112 and/or the opening 110. The vertical obstruction by the threads 708 increases the extraction force. Additionally, the guides 706 apply additional force on the threads 708. For example, the indentation of the guides 706 resists the extraction force of the fastener 702. The guides 706 further align and/or abut the threads 708, which increases the extraction force of the fastener 702.

Responsive to the fastener 702 traversing through the tube 112 and the guides 706, the legs 104-107 spread open. As the legs 104-107 spread apart, the beams 108 protrude from the legs 104-107. For example, the beams 108 are directed away from the legs 104-107 and positioned towards the panel 502.

FIG. 8 illustrates a perspective bottom view of the fastener 702 coupled to the box nut retainer system 100, according to an embodiment of the present disclosure. For example, the indentations of the guides 706 are shown in FIG. 8. The guides 706 are shown having the circular indentations 712, and are guided by the threads 708 of the fastener 702. For example, the guides 706 are shown aligned with the threads 708 of the fastener 702.

As the legs 104-107 are spread by the fastener 702, the beams 108 are directed toward the fastener panel 502b. For example, the legs 104-107 spread with respect to each other based on the insertion of the fastener 702 within the tube 112. Responsive to the expansion of the legs 104-107, positions of the beams 108 are adjusted with the legs 104-107. As shown in FIG. 8, the positions of the beams 108 are directed toward the fastener panel 502b.

FIG. 9 illustrates a lateral view of the fastener 702 coupled to a box nut retainer system 100, according to an embodiment of the present disclosure. Responsive to the fastener 702 traversing through the tube 112, the legs 104-107 are spread towards the fastener panel 502b. Additionally, as the legs 104-107 are spread, the beams 108 are repositioned to abut and/or be in contact with the fastener panel 502b. The compression pressure applied to the panel 502 by the fastener 702, further applies a force onto the curved orthogonal angles 123-126. The force on the curved orthogonal angles 123-126 is configured to spread the legs 104-107 toward the fastener panel 502b. Responsive to the spreading of the legs 104-107, the beams 108 protrude from the legs 104-107. For example, the beams 108 are directed toward and are directly in contact with the fastener panel 502b.

The beams 108 apply friction to the distal ends 408 of the beams 108, which hold a position relative to the panel 502. For example, the compression pressure generated by the fastener 702 spreads the legs 104-107, thereby applying a force onto the beams 108. The force applied to the beams 108 is configured to oppose lateral motion of the beams 108 relative to the panel 502. The force provides a fixed position of the beams 108 relative to the panel 502.

Embodiments of the present disclosure provide a fastening system, and, more particularly, a box nut retainer system that is configured to securely connect multiple components together. The box nut retainer system includes ergonomic bends, which adjust the insertion force and hold the box nut retainer system in a fixed position relative to a panel.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A box nut retainer system, comprising:
a panel configured to receive a fastener;
a plurality of retainer legs extending from the panel; and
planar bends positioned at distal ends of the plurality of retainer legs, straight beams extending from the planar bends, the straight beams having engagement angles relative to the plurality of retainer legs, wherein an insertion force of the fastener is based on the engagement angles.

2. The box nut retainer system of claim 1, further comprising a fastener tube that extends through the panel.

3. The box nut retainer system of claim 2, wherein the fastener tube extends through the panel and defines a fastener intake passage.

4. The box nut retainer system of claim 3, wherein the fastener intake passage includes an internal circumference that is threaded.

5. The box nut retainer system of claim 4, wherein the panel is interposed between a mating panel and a fastener panel.

6. The box nut retainer system of claim 4, wherein the insertion force of the fastener is configured to generate a compression pressure on a mating panel and a fastener panel.

7. The box nut retainer system of claim 1, wherein the plurality of retainer legs are configured to spread apart such that a plurality of guides abut the fastener.

8. The box nut retainer system of claim 1, wherein the plurality of retainer legs are positioned a distance away from a fastener tube extending from the panel.

9. The box nut retainer system of claim 8, wherein the fastener tube is configured to receive M5 fasteners.

10. The box nut retainer system of claim 1, wherein responsive to the plurality of retainer legs spreading, the straight beams are configured to be directed towards a fastener panel.

11. The box nut retainer system of claim 10, wherein the straight beams are configured to protrude from the plurality of retainer legs based on the engagement angle.

12. The box nut retainer system of claim 10, wherein responsive to the plurality of retainer legs spreading, the straight beams are configured to be in contact with a fastener panel.

13. A box nut retainer system, comprising:
a panel configured to receive a fastener;
a fastener tube that extends through the panel and defines a fastener intake passage;
a plurality of retainer legs extending from the panel; and
planar bends positioned at distal ends of the plurality of retainer legs, straight beams extending from the planar bends, the straight beams having engagement angles relative to the plurality of retainer legs, the straight beams are configured to protrude from the plurality of retainer legs based on the engagement angles, wherein an insertion force of the fastener is based on the engagement angles.

14. The box nut retainer system of claim 13, wherein the panel is interposed between a mating panel and a fastener panel, an insertion force of the fastener is configured to generate a compression pressure on the mating panel and the fastener panel.

15. The box nut retainer system of claim 13, wherein the plurality of retainer legs are configured to spread out responsive to the insertion of the fastener in the fastener tube such that a plurality of guides abut the fastener.

16. The box nut retainer system of claim 13, wherein the plurality of retainer legs are positioned a distance away from the fastener passage area extending from the panel.

17. The box nut retainer system of claim 13, wherein the fastener tube includes an internal circumference that is threaded.

18. The box nut retainer system of claim 17, wherein the fastener tube is configured to receive M5 fasteners.

19. A box nut retainer system, comprising:
a panel configured to receive a fastener;
a fastener tube that extends through the panel and defines a fastener intake passage, the fastener tube includes an internal circumference that is threaded;
a plurality of retainer legs extending from the panel, wherein the plurality of retainer legs extend at curved orthogonal angles from the upper panel, the plurality of retainer legs being positioned a distance away from the fastener tube and extend from the panel, the plurality of retainer legs are configured to spread towards a fastener panel responsive to the fastener inserted into the fastener tube; and
planar bends positioned at distal ends of the plurality of retainer legs, straight beams extend from the planar bends, the straight beams having engagement angles relative to the plurality of retainer legs, the straight beams are configured to protrude from the plurality of retainer legs based on the engagement angles, wherein an insertion force of the fastener is based on the engagement angles.

* * * * *